(12) United States Patent
Luby

(10) Patent No.: US 6,873,340 B2
(45) Date of Patent: Mar. 29, 2005

(54) METHOD AND APPARATUS FOR AN AUTOMATED REFERENCE INDICATOR SYSTEM FOR PHOTOGRAPHIC AND VIDEO IMAGES

(75) Inventor: James H. Luby, Stillwater, OK (US)

(73) Assignee: Visimatix, Inc., Stillwater, OK (US)

( * ) Notice: Subject to any disclaimer, the term of this patent is extended or adjusted under 35 U.S.C. 154(b) by 0 days.

(21) Appl. No.: 10/322,278

(22) Filed: Dec. 16, 2002

(65) Prior Publication Data

US 2003/0085908 A1 May 8, 2003

Related U.S. Application Data

(63) Continuation of application No. 09/418,796, filed on Oct. 15, 1999, now abandoned, which is a continuation-in-part of application No. 08/857,015, filed on May 15, 1997, now abandoned.

(51) Int. Cl.[7] .............................................. G06T 15/00
(52) U.S. Cl. ...................................................... 345/619
(58) Field of Search ................................ 345/419, 619, 345/620, 629, 418; 348/135, 136, 137

(56) References Cited

U.S. PATENT DOCUMENTS

| 4,370,039 | A | 1/1983 | Landwehr ..................... 396/14 |
| 4,382,678 | A | 5/1983 | Thompson et al. .......... 356/150 |
| 4,535,782 | A | 8/1985 | Zoltan ......................... 600/477 |
| 4,564,295 | A | 1/1986 | Halioua ....................... 356/605 |
| 4,569,358 | A | 2/1986 | Gormley ..................... 600/587 |
| 4,618,256 | A | 10/1986 | Bartolomeo ................. 356/23 |
| 4,630,910 | A | 12/1986 | Ross et al. .................. 396/334 |
| 4,639,107 | A | 1/1987 | Landwehr ..................... 396/14 |
| 4,666,307 | A | 5/1987 | Matsumoto et al. ........ 356/404 |
| 4,736,739 | A | 4/1988 | Flaton ......................... 128/853 |
| 4,767,212 | A | 8/1988 | Kitahashi et al. ........... 702/167 |
| 4,786,925 | A | 11/1988 | Landwehr .................... 348/137 |
| 4,794,550 | A | 12/1988 | Greivenkamp, Jr. ........ 702/167 |
| 4,809,066 | A | * 2/1989 | Leberl et al. ................ 348/137 |
| 4,829,373 | A | 5/1989 | Leberl et al. ................. 348/47 |
| 4,841,445 | A | 6/1989 | Yamamoto .................... 701/51 |
| 4,849,912 | A | 7/1989 | Leberl et al. ............... 702/189 |
| 4,878,247 | A | 10/1989 | Wester-Ebbinghaus ..... 382/113 |

(Continued)

FOREIGN PATENT DOCUMENTS

WO          9717882          5/1997

*Primary Examiner*—Phu K. Nguyen
(74) *Attorney, Agent, or Firm*—Dunlap, Codding & Rogers, P.C.

(57) ABSTRACT

The present invention relates generally to an automated reference indicator system. In one embodiment, the present invention provides a first reference indicator patch disposed near an area of interest, such as a wound, on an object, such as a human. A first image depicting the area of interest and the first reference indicator patch is captured and then input into a computer apparatus. A first set of data regarding the area of interest is then calculated by the computer apparatus based on an analysis of the first reference indicator patch and the area of interest. A second image of the area of interest and a second reference indicator patch disposed on at least a portion of the object is captured and subsequently input into the computer apparatus. The second image is typically taken at a time different from when the first image was taken. For example, the second image could be captured two weeks after the first image was captured. The computer apparatus locates the second reference indicator patch depicted in the second image and then calculates a second set of data regarding the area of interest based on an analysis of the second reference indicator patch and the area of interest. The computer apparatus then compares the first set of data to the second set of data to determine differences between the area of interest as depicted in the first image and the area of interest as depicted in the second image.

20 Claims, 4 Drawing Sheets

U.S. PATENT DOCUMENTS

| | | | |
|---|---|---|---|
| 4,894,551 A | 1/1990 | Kishimoto et al. | 250/259.23 |
| 4,922,909 A | 5/1990 | Little et al. | 600/300 |
| 4,981,360 A | 1/1991 | Schwarz | 356/605 |
| 4,987,432 A | 1/1991 | Landwehr | 348/77 |
| 4,996,994 A | 3/1991 | Steinhauer et al. | 600/587 |
| 5,040,059 A | 8/1991 | Leberl | 348/135 |
| 5,069,549 A | 12/1991 | Harding | 356/605 |
| 5,076,698 A | 12/1991 | Smith et al. | 356/602 |
| 5,135,308 A | 8/1992 | Kuchel | 356/604 |
| 5,142,160 A | 8/1992 | Storbeck | 250/599.08 |
| 5,189,493 A | 2/1993 | Harding | 356/605 |
| 5,206,699 A | 4/1993 | Stewart et al. | 356/30 |
| 5,224,049 A | 6/1993 | Mushabac | 700/163 |
| 5,231,678 A | 7/1993 | Takatori et al. | 382/154 |
| 5,257,184 A | 10/1993 | Mushabac | 433/75 |
| 5,280,342 A | 1/1994 | McConnell | 356/601 |
| 5,289,264 A | 2/1994 | Steinbichler | 356/605 |
| 5,343,294 A | 8/1994 | Kuchel et al. | 356/604 |
| 5,343,391 A | 8/1994 | Mushabac | 433/76 |
| 5,347,454 A | 9/1994 | Mushabac | 433/214 |
| 5,365,935 A | 11/1994 | Righter et al. | 600/523 |
| 5,442,444 A | 8/1995 | Landwehr | 356/604 |
| 5,448,472 A | 9/1995 | Mushabac | 433/70 |
| 5,485,682 A | 1/1996 | Le Breton | 33/773 |
| 5,499,457 A | 3/1996 | Weiler et al. | 33/512 |
| 5,545,039 A | 8/1996 | Mushabac | 433/215 |
| 5,559,318 A | 9/1996 | Aoki | 235/454 |
| 5,560,119 A | 10/1996 | LeBreton | 33/373 |
| 5,562,448 A | 10/1996 | Mushabac | 433/215 |
| 5,628,315 A | 5/1997 | Vilsmeier et al. | 600/426 |
| 5,636,025 A | 6/1997 | Bieman et al. | 356/619 |
| 5,669,685 A | 9/1997 | Kotani et al. | 353/28 |
| 5,673,647 A | 10/1997 | Pratt | 119/51.02 |
| 5,681,327 A | 10/1997 | Heywang-Koebrunner | 606/130 |
| 6,557,251 B2 * | 5/2003 | Hudson | 29/833 |

* cited by examiner

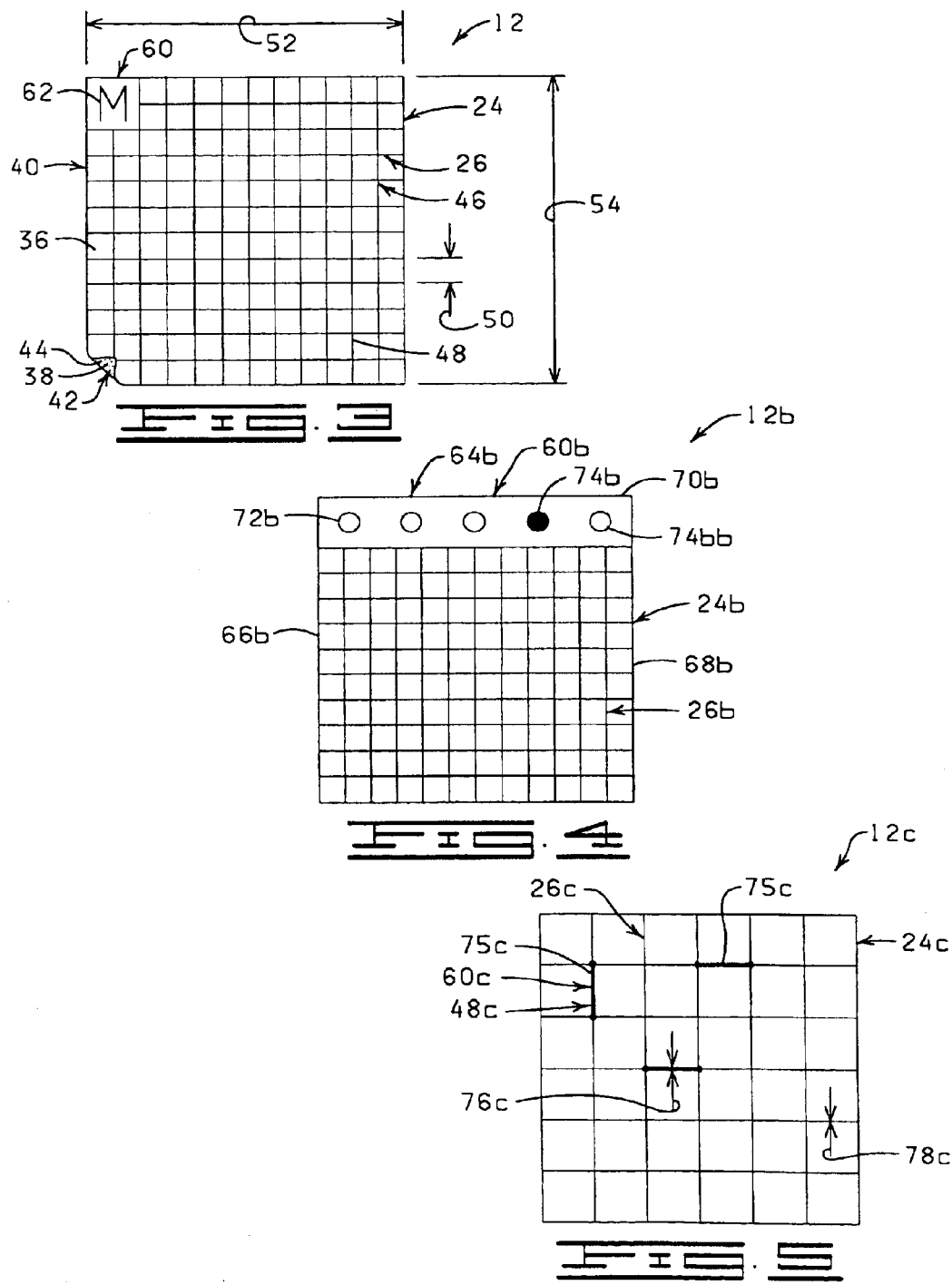

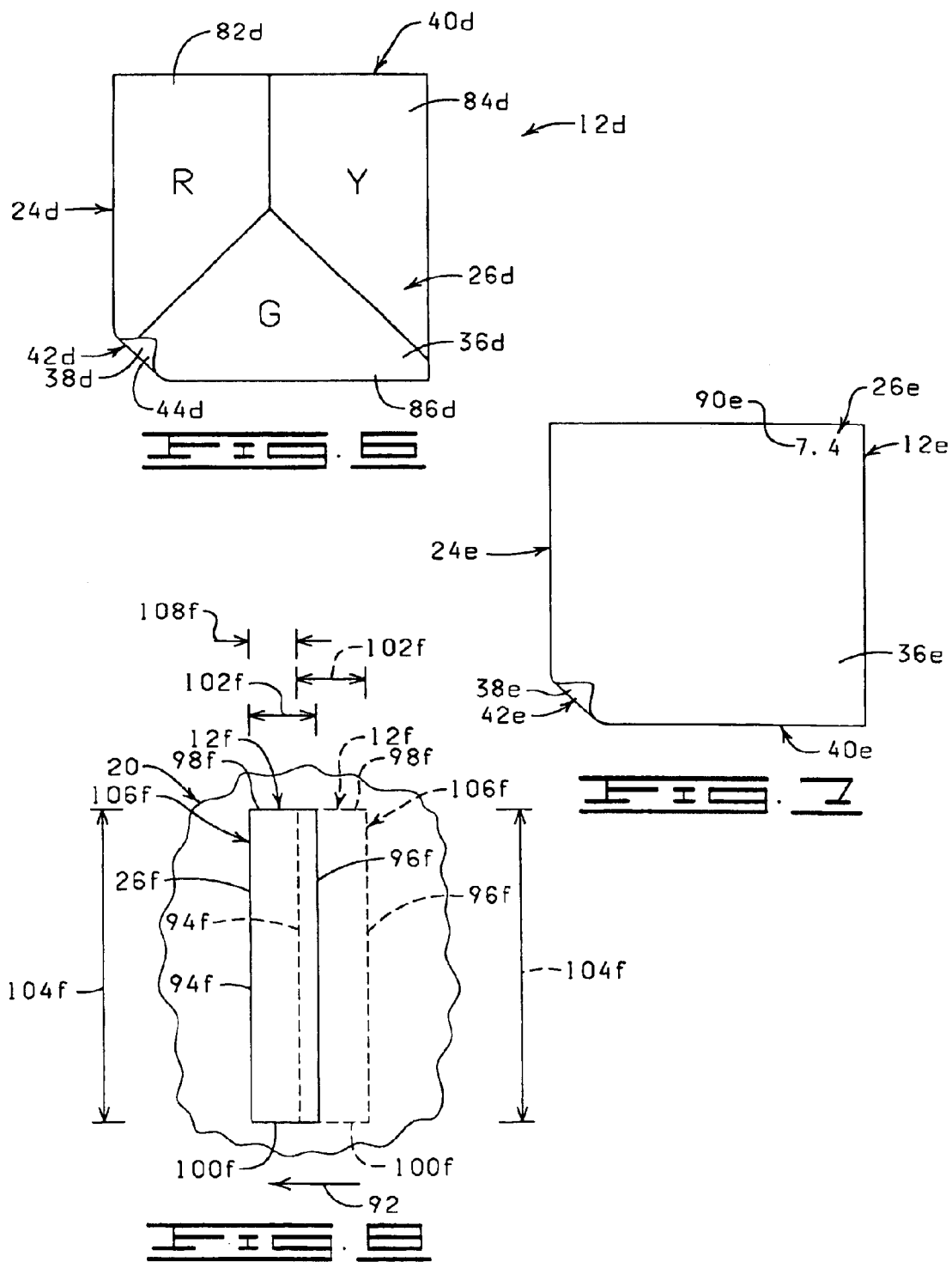

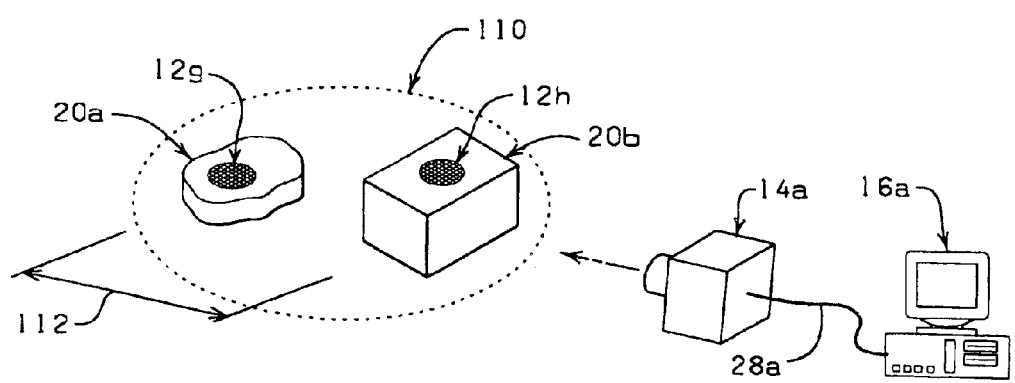
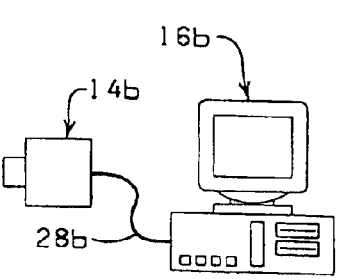
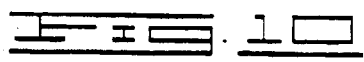

METHOD AND APPARATUS FOR AN AUTOMATED REFERENCE INDICATOR SYSTEM FOR PHOTOGRAPHIC AND VIDEO IMAGES

CROSS REFERENCE TO RELATED APPLICATIONS

This application is a continuation of U.S. Ser. No. 09/418,796, filed on Oct. 15, 1999, now abandoned which is a continuation-in-part of U.S. Ser. No. 08/857,015, filed on May 15, 1997, now abandoned the entire content of which is hereby expressly incorporated herein by reference.

STATEMENT REGARDING FEDERALLY SPONSORED RESEARCH OR DEVELOPMENT

Not applicable.

BACKGROUND OF THE INVENTION

Photographic and video camera systems are well known in the art. Digital models of photographic and video cameras are more recently available and also are well known in the art. Since the advent of digital image capture, the post-capture processing of images has become more feasible than with early image capture methods on film. A variety of digital image processing systems are well known in the art.

In certain instances, it is desirable to calibrate the subject matter or object of an image for dimension, color, light, motion or other parameters. Numerous systems are discussed in the art but often depend on an indirect or derived calculation for an important parameter. For example, in quantitating the dimensions of an object, the distance from the camera lens to the object may be taken so that certain dimensions on the object may then be calculated.

In view thereof, it is submitted that a need exists for a simple and relatively inexpensive automated reference system capable of accurately calculating various data regarding the object of an image to provide useful information concerning the object as a result of post-capture image processing of the object relative to a reference indicator patch. It is to such an inexpensive, simple and accurate automated reference system that the present invention is directed.

BRIEF SUMMARY OF THE INVENTION

The present invention relates to methods and apparatus for generating precise and accurate data relative to an object being captured by photographic or video camera systems. Specifically, a first image depicting at least a portion of an object having a reference indicator patch disposed thereon is input into a computer apparatus. The computer apparatus locates the reference indicator patch depicted on the photographic or video image and then generates data relative to the object based on an analysis of the reference indicator patch and at least a portion of the object.

In one embodiment, the present invention provides a first reference indicator patch disposed near an area of interest, such as a wound, on an object, such as a human. A first image encompassing the area of interest and the first reference indicator patch is captured by an image recording apparatus and then input into a computer apparatus. A first set of data regarding the boundaries of the area of interest (such as the dimensional area of the area of interest) is then calculated by the computer apparatus based on an analysis of the first reference indicator patch and the area of interest as depicted in the first image. A second image of the same area of interest (i.e. wound) on the object and a second reference indicator patch disposed on at least a portion of the object is captured by the image recording apparatus and subsequently input into the computer apparatus. The second image is typically captured at a time different from when the first image was captured. For example, the second image could be captured a two weeks after the first image was captured. The computer apparatus locates the second reference indicator patch depicted in the second image and then calculates a second set of data regarding the boundaries of the area of interest based on an analysis of the second reference indicator patch and the area of interest as depicted in the second image. The computer apparatus then compares the first set of data to the second set of data to determine differences between the area of interest as depicted in the first image and the area of interest as depicted in the second image. These differences will typically indicate the progression of the healing of the wound over time.

In another embodiment, the present invention provides a reference indicator patch disposed near an object, such as the original painting of the Mona Lisa by Leonardo da Vinci. An image encompassing the object and the reference indicator patch is captured by an image recording apparatus and then input into a computer apparatus. A set of data regarding the accurate dimensions and colors of the painting may then be calculated allowing output to a large digital display of a life-size, life-like rendition of the original.

In yet another embodiment, the present invention provides a first reference indicator patch disposed near an object such as a human face afflicted with facial paralysis of unknown etiology. A first video recording encompassing the object and the first reference indicator patch is captured by an image recording apparatus and then input into a computer apparatus. A first set of data regarding the boundaries and areas of paretic zones on the face is then calculated by the computer apparatus based on an analysis of the first reference indicator patch and the object as depicted in the first video. A second video recording of the object and a second reference indicator patch disposed on at least a portion of the object is captured by the image recording apparatus and subsequently input into the computer apparatus. The second video recording is typically captured at a time different from when the first video recording was captured. The computer apparatus locates the second reference indicator patch depicted in the second video recording and then calculates a second set of data regarding the boundaries and areas of paretic zones based on an analysis of the second reference indicator patch and the object. The computer apparatus then compares the first set of data to the second set of data to determine the progression of the paralysis.

Thus, the methods and apparatus of the present invention provide a relatively inexpensive, simple and accurate way to calculate certain data regarding the subject of an image.

Other objects, features and advantages of the present invention will be apparent to those skilled in the art from the following detailed description when read in conjunction with the accompanying drawings and appended claims.

BRIEF DESCRIPTION OF THE SEVERAL VIEWS OF THE DRAWING

FIG. 3 is a front view of one embodiment of a reference indicator patch constructed in accordance with the present invention.

FIG. 4 is a front view of a second embodiment of a reference indicator patch constructed in accordance with the present invention.

FIG. 5 is a front view of a third embodiment of a reference indicator patch constructed in accordance with the present invention.

FIG. 6 is a front view of a fourth embodiment of a reference indicator patch constructed in accordance with the present invention wherein the reference indicator patch is divided into a plurality of areas with each area filled with a different color to provide a color reference for a computer apparatus.

FIG. 7 is a front view of a fifth embodiment of a reference indicator patch which is constructed in accordance with the present invention and which provides an indication of the ambient light conditions encompassing the object near the time at which an image encompassing the object and the reference indicator patch is captured.

FIG. 8 is a front view of a sixth embodiment of a reference indicator patch constructed in accordance with the present invention wherein the reference indicator patch is disposed on a moving object to provide an indication of the speed and direction of travel of the object.

FIG. 9 is a partial perspective, diagrammatic view of a second embodiment of an automated reference indicator system constructed in accordance with the present invention.

FIG. 10 is a partial perspective, diagramamtic view of a seventh embodiment of a reference indicator patch constructed in accordance with the present invention wherein the reference indicator patch is disposed on an object.

DETAILED DESCRIPTION OF THE INVENTION

Figure 1:
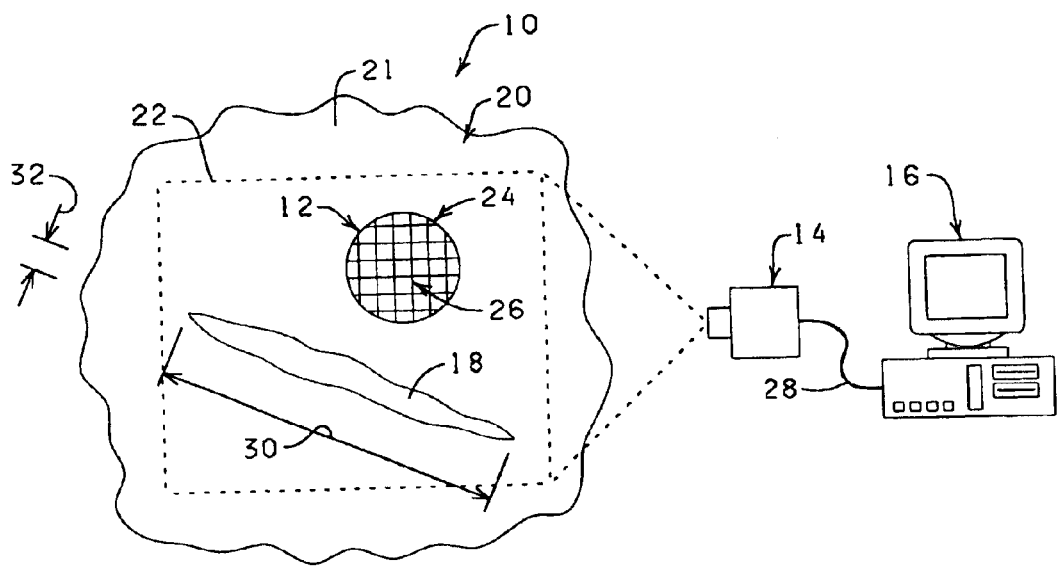
FIG. 1 is a schematic, diagrammatic view of an automated reference indicator system constructed in accordance with the present invention and depicting the capturing of a first image of a portion of an object.

Referring now to the drawings and more particularly to FIG. 1, shown therein and designated by the general reference numeral 10 is an automated reference indicator system which is constructed in accordance with the present invention. The automated reference indicator system is provided with a reference indicator patch 12, an image recording apparatus 14 and a computer apparatus 16. The reference indicator patch 12 is disposed near an area of interest 18 on an object 20. Only a portion of the object 20 is shown in FIG. 1 for purposes of clarity.

The reference indicator patch 12 is disposed on an exterior surface 21 of the object 20 such that the reference indicator patch 12 and the area of interest 18 are capable of being simultaneously captured by the image recording apparatus 14 to provide a first image 22 (as indicated by the dashed lines) of the area of interest 18 and the reference indicator patch 12. The object 20 can be any object capable of being imaged or photographed. For example, the object can be a car, a building, a chair, a desk, a human, a painting, a mountain, a lake, or any other type of geography, device, or animal.

The area of interest 18 can be any feature which is formed integrally with the object 20 or disposed on the object 20. For example, assuming that the object 20 is a human, the area of interest 18 may be a wound or a mole; and assuming that the object 20 is a car, the area of interest 18 may be a dent. It should be noted that when the area of interest 18 is the entire object 20, such as a painting, the reference indicator patch 12 may be disposed near the object 20 so as to not cover any of the area of interest 18.

The reference indicator patch 12 is provided with a substrate 24 adapted to be disposed on the object 20. The reference indicator patch 12 is further provided with a reference assembly 26 disposed on the substrate 24 such that the reference assembly 26 is perceivable by the image recording apparatus 14.

In operation, the reference indicator patch 12 is typically disposed on at least a portion of the object 20, typically near the area of interest 18. The image recording apparatus 14 is then utilized to capture or record a portion of the object 20 encompassing the reference indicator patch 12 and the area of interest 18 to provide the first image 22. The image recording apparatus 14 then outputs the first image 22 over a communication link 28 to be received by the computer apparatus 16 to thereby input the first image 22 into the computer apparatus 16. The communication link 28 can be a cable or any other suitable means for communicating the first image 22 to the computer apparatus 16, for example.

In response to receiving the first image 22, the computer apparatus 16 is programmed to locate the reference indicator patch 12 depicted in the first image 22. The computer apparatus 16 then generates a first set of data relative to the object 20 based on an analysis of the reference indicator patch 12 and the portion of the object 20 depicted in the first image 22.

The first set of data relative to the object 20 generated by the computer apparatus 16 based on an analysis of the reference indicator patch 12 can include any type of post capture image processing analysis such as dimensional analysis, color analysis, depth analysis, and motion analysis regarding the object 20. For example, the first set of data relative to the object 20 can include the distance from the object 20 to the image recording apparatus 14 or the calibrated color or colors of the area of interest 18 of the object 20. In other words, the computer apparatus 16 can determine the distance from the object 20 to the image recording apparatus 14 or can calibrate the color or colors of the area of interest 18 of the object 20 by analyzing the reference indicator patch 12 included in the first image 22.

In addition, in one embodiment, the computer apparatus 16 can be programmed to selectively calculate various dimensional data regarding the boundaries of the area of interest 18 based on an analysis of the area of interest 18 and the reference indicator patch 12 provided in the first image 22. The data regarding the boundaries of the area of interest 18 can be determined by an edge detection algorithm programmed into the computer apparatus 16 to determine the boundaries of the area of interest 18. Once the boundaries of the area of interest 18 are determined or located, the computer apparatus 16 can determine other data regarding the boundaries of the area of interest 18 such as the area (not shown) of the area of interest 18, or a length 30 of the area of interest 18, or a width 32 of the area of interest 18.

Figure 2:
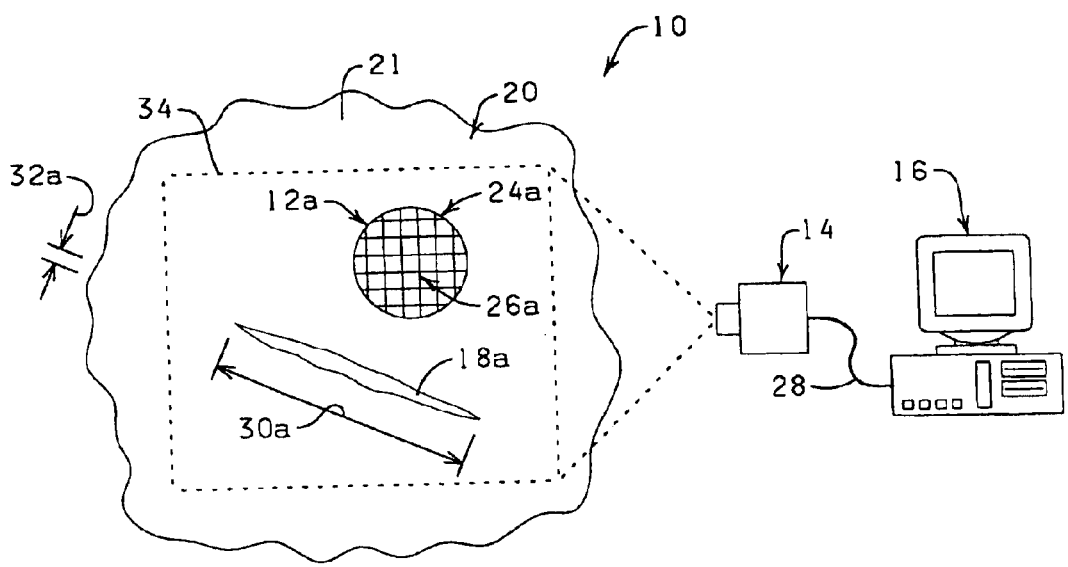
FIG. 2 is a schematic, diagrammatic view of the automated reference indicator system depicted in FIG. 1 and illustrating the capturing of a second image of the portion of the object at a time different from when the first image was captured.

Referring now to FIG. 2, shown therein is the automated reference indicator system 10 having a second reference indicator patch 12a disposed on the exterior surface 21 of the object 20 near the area of interest 18 (the area of interest 18 shown in FIG. 2 is denoted by the reference numeral 18a and will be described hereinafter with the reference numeral 18a for purposes of clarity) such that the image recording apparatus 14 can simultaneously capture a second image 34 encompassing both the reference indicator patch 12a and the area of interest 18a. The reference indicator patch 12a is provided with a substrate 24a which is adapted to be disposed on or near the object 20, and a reference assembly 26a which is perceivable by the image recording apparatus 14 for providing the computer apparatus 16 with a reference to permit the computer apparatus 16 to generate data relative to the object 20.

The reference indicator patch 12a is identical to the reference indicator patch 12 hereinbefore described with reference to FIG. 1 in construction and function. It should be understood that the area of interest 18a is the same area of interest as the area of interest 18 except that a period of time has passed between the capturing of the first image 22 and the second image 34. However, the dimensions of the area of interest 18 depicted in the first image 22 may have changed as compared to the dimensions of the area of interest 18a depicted in the second image 34 because of natural and/or unnatural causes. For example, as shown in FIGS. 1 and 2 the area of interest 18 can be a wound or other body surface which has decreased in size from the time that the first image 22 was taken to the time that the second image 34 was taken due to the healing process of a human.

The second image 34 depicting the area of interest 18a and the second reference indicator patch 12a is input into the computer apparatus 16 by the image recording apparatus 14 via the communication link 28. The computer apparatus 16 then locates the second reference indicator patch 12a and the area of interest 18a depicted in the second image 34. Then, the computer apparatus 16 calculates a second set of data regarding the boundaries of the area of interest 18a based on an analysis of the second reference indicator patch 12a and the area of interest 18a in substantially the same manner as the first set of data regarding the area of interest 18 was determined as hereinbefore described with reference to FIG. 1.

The second set of data regarding the area of interest 18a can include any type of dimensional, color, depth, motion, or light analysis of the object 20 or the area of interest 18a of the object 20. For example, the second set of data regarding the area of interest 18a may include the area of the area of interest 18a, a length 30a of the area of interest 18a, or a width 32a of the area of interest 18a. In other words, the computer apparatus 16 locates the second reference indicator patch 12a in the second image 34 and analyzes the reference assembly 26a on the reference indicator patch 12a to provide a reference so that information relating to the object 20 or the area of interest 18a can be calculated.

The computer apparatus 16 then compares the first set of data regarding the area of interest 18 to the second set of data regarding the area of interest 18a to determine the differences between the area of interest 18 as depicted in the first image 22 and the area of interest 18a as depicted in the second image 34.

For example, when calculating the first set of data, the computer apparatus 16 may calculate the area or other data regarding the boundaries of the area of interest 18 when the area of interest 18 is a wound on a human body. When calculating the second set of data, the computer apparatus 16 may calculate the area or other data regarding the boundaries of the area of interest or wound 18a. The computer apparatus 16 then compares the area of the area of interest or wound 18 to the area of the area of interest or wound 18a to determine whether the area has either increased, decreased, or stayed substantially the same. In one embodiment, the computer apparatus 16 can indicate that the area of interest 18a is a percentage such as 20% smaller than the area of interest 18 to indicate the change in area of the wound. This change can be used to track the progress of the healing of the wound over time. In addition, the computer apparatus 16 may be programmed to determine the change in color of the area of interest 18 by a comparison of the first and second sets of data.

The image recording apparatus 14 can be any image recording apparatus capable of taking a still or moving image and providing the image to the computer apparatus 16 in a form understandable thereby. For example, in one embodiment the image recording apparatus 14 may be a camera or video imaging apparatus capable of taking a single image or multiple consecutive images and providing that image or images to the computer apparatus 16 in a digital format. In another embodiment, the image recording apparatus 14 may be a camera or video imaging apparatus utilizing a light sensitive film which has to be developed in a manner well known in the art. Once the image is developed, the image may be scanned into the computer apparatus 16 by a scanner provided as a part of the image recording apparatus 14. In yet another embodiment, the image recording apparatus 14 may be a camera or video imaging apparatus capable of taking a video recording and providing the video recording to the computer apparatus 16 in an analog format.

The computer apparatus 16 may be a system or systems which are able to embody and/or execute the logic of the processes described herein. The logic embodied in the form of software instructions or firmware may be executed on any appropriate hardware which can be a dedicated computer system or systems, a general purpose computer system such a personal computer, or a distributed processing computer system. All of these computer systems are well understood in the art. Thus, a detailed description of how to make or use such computer systems is not deemed necessary herein.

Referring now to FIG. 3, the reference indicator patch 12 is shown in more detail. The substrate 24 of the reference indicator patch 12 has a front surface 36, a rear surface 38, and an outer peripheral edge 40.

The reference indicator patch 12 is provided with a connecting assembly 42 for permitting the substrate 24 of the reference indicator patch 12 to be connected to the object 20. In one embodiment, the connecting assembly 42 includes a bonding material 44 applied to at least a portion of the rear surface 38 of the reference indicator patch 12 to permit the substrate 24 to be bondingly connected to at least a portion of the object 20. The bonding material 44 can be applied to a portion of the rear surface 38 of the substrate 24 or the entire rear surface 38 of the substrate 24, or can also be applied to the rear surface 38 in spots, strips, or any other suitable configuration. Although the connecting assembly 42 has been described herein as a bonding material 44 applied to the rear surface 38 of the substrate 24 of the reference indicator patch 12 it should be understood that the connecting assembly 42 can be any means capable of connecting the substrate 24 of the reference indicator patch 12 to at least a portion of the object 20. For example, the connecting assembly 42 can be a tape disposed across a portion of the object 20 and the reference indicator patch 12 to connect the reference indicator patch 12 thereto.

To connect the substrate 24 of the reference indicator patch 12 to at least a portion of the object 20 when the bonding material 44 is applied to the rear surface 38 thereof, one positions the rear surface 38 of the substrate 24 substantially adjacent the exterior surface 21 of the object 20. Then, force is applied to the substrate 24 to press the rear surface 38 carrying the bonding material 44 against the exterior surface 21 of the object 20 to bondingly connect the reference indicator patch 12 to the object 20.

The reference assembly 26 of the reference indicator patch 12 is directed to providing dimensional information to the computer apparatus 16. The reference assembly 26 includes indicia 46 disposed on the front surface 36 of the substrate 24 in any appropriate configuration recognizable by the computer apparatus 16 to form a reference permitting the computer apparatus 16 to generate data relative to the object 20. As shown in FIG. 3, the indicia 46 of the reference assembly 26 can be in the form of a plurality of lines 48 which are spaced a uniform distance 50 apart in the form of a grid. The spacing 50 of the lines 48 is known by the computer apparatus 16 to form the reference permitting the computer apparatus 16 to generate data relative to the object 20. In other words, by knowing the spacing 50 of the lines 48, the computer apparatus 16 is programmed to determine various data regarding the reference indicator patch 12 so that data regarding the area of interest 18 and/or the object 20 can subsequently be determined.

It should be noted that the reference assembly 26 may be provided integrally with the substrate 24 by utilizing a predetermined width 52 extending generally between opposing sides of the substrate 24 substantially as shown, or a predetermined height 54 extending generally between opposing edges of the substrate 24, or the substrate 24 may be provided in any predetermined size or configuration to form a reference on the object 20 to permit the computer apparatus 16 to generate data relative to the object 20.

It should be noted that the automated reference indicator system 10 can utilize different reference assemblies on the substrate 24 of the reference indicator patch 12 depending on the particular application of the system 10 and the size of the object 20 or the area of interest 18 of the object 20. For example, when the automated reference indicator system 10 is utilized to determine the progression over time of the healing of a relatively small wound on a human as previously discussed, the reference assembly 26 disposed on the substrate 24 of the reference indicator patch 12 may be the plurality of spaced apart lines 48 having a spacing of about one-eighth to about one-quarter of an inch. However, when the automated reference indicator 10 is utilized to determine various data regarding a large dent on an automobile for example, the reference assembly 26 on the substrate 24 of the reference indicator patch 12 may be in the form of the spaced apart lines 48 having a spacing 50 of about one inch. In other words, the spacing 50 of the lines 48 of the reference indicator patch 12 and/or the predetermined width 52 and/or the predetermined height 54 of the substrate 24 can be changed depending on the size of the area of interest 18 and/or the object 20. For larger objects 20 and/or areas of interests 18, a larger spacing 50 between the lines 48 and/or larger predetermined width 52 and/or predetermined height 54 are typically desirable.

Because various reference assemblies 26 can be utilized on the reference indicator patch 12 of the automated reference indicator system 10, a code assembly 60 is disposed on the front surface 36 of the substrate 24 of the reference indicator patch 12 such that the code assembly 60 is perceivable by the image recording apparatus 14 for indicating a particular one of the plurality of the reference assemblies 26 disposable on the substrate 24 to the computer apparatus 16. In the embodiment of the reference indicator patch 12 shown in FIG. 3, the code assembly 60 takes the form of a predetermined character 62 such as the capital letter "M" disposed in an upper left corner of the substrate 24. When the computer apparatus 16 receives a captured image, such as the first image 22 or the second image 34, the computer apparatus 16 may be preprogrammed with an optical character recognition program to locate the code assembly 60 and to recognize which of the predetermined characters 62 are disposed on the substrate 24 to indicate which of the plurality of reference assemblies 26 is disposed on the substrate 24 depicted in the captured image. For example, the capital "M" shown in FIG. 3 may indicate to the computer apparatus 16 that the spacing 50 between the lines 48 is a predetermined number of millimeters; a capital "C" may indicate to the computer apparatus 16 that the spacing 50 between the lines 48 is a predetermined number of centimeters; and a capital "Q" may indicate that the spacing 50 between the lines 48 is a quarter inch and a capital "I" may indicate that the spacing 50 between the lines is one inch.

Referring now to FIG. 4, shown therein and designated by the general reference numeral 12b is another embodiment of a reference indicator patch constructed in accordance with the present invention. The reference indicator patch 12b is substantially identical in construction and function as the reference indicator patch 12 hereinbefore described with reference to FIGS. 1 and 3, except that the reference indicator patch 12b is provided with a code assembly 60b in the form of a legend 64b extending generally between a first side 66b and a second side 68b of a substrate 24b, generally near an upper end 70b thereof. The legend 64b is provided with indicia 72b in the form of a plurality of spatially disposed circularly shaped spots 74. Although five spots 74 are shown in FIG. 4, only two of the spots are designated by the reference numerals 74b and 74bb for purposes of clarity. The spot 74b is a generally solidly colored spot and the spot 74bb represents only an outline of the spot. The configuration of solidly colored spots 74b and outlined spots 74bb indicates to the computer apparatus 16 the particular one of the reference assemblies 26 utilized on the reference indicator patch 12b.

It should be understood that the present invention is not limited to the spots 74 having a circular configuration and the legend 64b being formed from five of the spots 74. Thus, it should also be understood that the spots 74 can have any type of asymmetrical, symmetrical or fanciful configuration and be provided in any number to form the legend 64b of the code assembly 60b. In addition, the spots 74 can be colored spots or can be any other type of photo-optically perceivable spots so long as the spots 74 are recognizable by the computer apparatus 16 to indicate to the computer apparatus 16 which one of the reference assemblies 26b are disposed on the reference indicator patch 12 for the particular embodiment of the automated reference indicator system 10.

Referring now to FIG. 5, shown therein and designated by the general reference numeral 12c is a third embodiment of a reference indicator patch constructed in accordance with the present invention. The reference indicator patch 12c is constructed and functions identically as the reference indicator patches 12 and 12b hereinbefore described with reference to FIGS. 3 and 4, except that the reference indicator patch 12c is provided with a code assembly 60c formed from particular portions 75c of lines 48c having a greater thickness 76c than a thickness 78c of the remaining portions of the lines 48c forming the reference assembly 26c on a substrate 24c of the reference indicator patch 12c. The thicker portions 75c of the lines 48c are disposed in any appropriate configuration so that the software on the computer apparatus 16 can recognize the code assembly 60c on the reference indicator patch 12c to indicate which type of reference assembly 26c is disposed thereon. Thus, the lines 48c on two reference indicator patches 12c may be different to identify the particular reference assemblies 26c disposed on the reference indicator patches 12c.

Although the code assemblies 60, 60b and 60c have been described herein in the form of the character 62, the legend 64b, and the configuration of lines 48c having different thicknesses, it should be understood that the code assemblies 60, 60b and 60c can be formed from any type of photo optically perceivable indicia so long as the computer apparatus 16 can recognize the particular code assembly 60 disposed on the reference indicator patches 12, 12b and 12c in the image provided by the image recording apparatus 14 so that the computer apparatus 16 can determine which of the plurality of reference assemblies 26, 26b and 26c are disposed on the substrates 24, 24b and 24c. In addition, the code assembly 60 could be formed integrally with the substrate 24 in that the shape of the substrate 24 could function as the code assembly 60. For example, the substrate 24 may be provided with a circular configuration to indicate one of the reference assemblies 26 to the computer assembly 16, the substrate 24 may be provided with a rectangular configuration to indicate a second one of the reference assemblies 26 to the computer apparatus 16, and the substrate 24 may be provided with an L-shaped configuration to indicate a third one of the reference assemblies 26 to the computer apparatus 16.

Referring now to FIG. 6, a reference indicator patch 12d constructed in accordance with the present invention is shown. The reference indicator patch 12d is provided with a substrate 24d. A reference assembly 26d is disposed on the substrate 24d such that the reference assembly 26d is perceivable by the image recording apparatus 14 when the reference indicator patch 12d is disposed on the exterior surface 21 provided on the object 20.

The substrate 24d of the reference indicator patch 12 has a front surface 36d, a rear surface 38d, and an outer peripheral edge 40d.

The reference indicator patch 12d is provided with a connecting assembly 42d for permitting the substrate 24d of the reference indicator patch 12d to be connected to the object 20. In one embodiment, the connecting assembly 42d includes a bonding material 44d applied to at least a portion of the rear surface 38d of the reference indicator patch 12d to permit the substrate 24d to be bondingly connected to at least a portion of the object 20. The bonding material 44d can be applied to a portion of the rear surface 38d of the substrate 24d or the entire rear surface 38d of the substrate 24d, or can also be applied to the rear surface 38d in spots, strips, or any other appropriate configuration. Although the connecting assembly 42d has been described herein as a bonding material 44d applied to the rear surface 38d of the substrate 24d of the reference indicator patch 12d, it should be understood that the connecting assembly 42d can be any means capable of connecting the substrate 24d of the reference indicator patch 12d to at least a portion of the object 20. For example, the connecting assembly 42d can be a tape disposed across at least a portion of the object 20 and the reference indicator patch 12d to connect the reference indicator patch 12d thereto.

To connect the substrate 24d of the reference indicator patch 12d to the exterior surface 21 of the object 20 when the bonding material 44d is applied to the rear surface 38d thereof, one positions the rear surface 38d of the substrate 24d substantially adjacent the exterior surface 21 of the object 20. Then, force is applied to the substrate 24d to press the rear surface 38d carrying the bonding material 44d against the exterior surface 21 of the object 20 to bondingly connect the reference indicator patch 12d to the object 20.

The reference assembly 26d of the reference indicator patch 12d is disposed on the front surface 36d of the substrate 24d. The reference assembly 26d is formed by dividing at least a portion of the front surface 36d of the substrate 24d into a first area 82d, a second area 84d, and a third area 86d. Generally, the first area 82d, the second area 84d, and the third area 86d are each provided with a predetermined different color which is known by the computer apparatus 16 so that the first area 82d, the second area 84d, and the third area 86d cooperate to provide an accurate color reference for the computer apparatus 16. By providing an accurate color reference for the computer apparatus 16, the reference assembly 26d of the reference indicator patch 12d permits the computer apparatus 16 to accurately determine the color or colors of the object 20 or the area of interest 18 of the object 20 when the computer apparatus 16 is engaged in post capture image processing.

In one embodiment, the first area 82d can be colored red, the second area 84d can be colored yellow, and the third area 86d can be colored green. However, it should be understood that the particular reference assembly 26d being formed from three areas having different colors of red, yellow, and green is provided solely by way of example. The reference assembly 26d can be formed from any appropriate predetermined number of differently colored areas which are known by the computer apparatus 16 so as to form a color reference for the computer apparatus 16 in the captured image.

Referring now to FIG. 7, a reference indicator patch 12e is shown. The reference indicator patch 12e is provided with a substrate 24e having a reference assembly 26e disposed thereon. The reference assembly 26e of the reference indicator patch 12e provides a reference to the computer apparatus 16 of the ambient light surrounding the object 20 or the area of interest 18 of the object 20 at substantially the moment that the captured image was recorded.

The substrate 24e of the reference indicator patch 12e has a front surface 36e, a rear surface 38e, and an outer peripheral edge 40e. The reference indicator patch 12e is provided with a connecting assembly 42e disposed on the rear surface 38e thereof. The connecting assembly 42e permits the substrate 24e of the reference indicator patch 12e to be connected to at least a portion of the object 20. The connecting assembly 42e is substantially identical in construction and function as the connecting assembly 42 and the connecting assembly 42d which have been hereinbefore described with reference to FIGS. 3 and 6, respectively.

The reference assembly 26e is disposed on the front surface 36e of the substrate 24e of the reference indicator patch 12e such that the reference assembly 26e is perceivable by the image recording apparatus 14 when the reference indicator patch 12e is disposed on or near the object 20. As shown in FIG. 7, in one embodiment, the reference assembly 26e takes the form of a plurality of predetermined characters 90e such as the numeral "7.4". When the computer apparatus 16 receives a captured image such as the first image 22 or the second image 34, the computer apparatus 16 may be pre-programmed with an optical character recognition program to locate the reference assembly 26e and to recognize the predetermined characters 90e disposed on the substrate 24e depicted in the captured image. In this example, the plurality of predetermined characters 90e (numeral 7.4) indicates a particular level of the ambient light conditions surrounding the object 20 substantially at the moment the captured image was recorded by the image recording apparatus 14.

The magnitude of the plurality of predetermined characters 90e can be determined by using a commercially available light meter to determine the ambient light conditions surrounding the object 20 immediately before the captured image is recorded. Once the light meter determines the ambient light conditions, these ambient light conditions can be entered into a computer or other apparatus to print the predetermined characters 90e on the substrate 24e of the reference indicator patch 12e to form the reference assembly 26e. After the reference assembly 26e has been provided on the reference indicator patch 12e, the reference indicator patch 12e can be disposed on the object 20 or near the area of interest 18 of the object 20 as hereinbefore described with reference to FIGS. 1 and 2.

Although the reference assembly 26e has been shown and described herein as the predetermined character 90e, it should be understood that the present invention is not limited to using the predetermined character 90e as the reference assembly 26e. For example, the reference assembly 26e can be formed from bar codes or any other predetermined photo-optically perceivable indicia capable of being understood by the computer apparatus 16.

Referring now to FIG. 8, shown therein is a reference indicator patch 12f (indicated by the solid lines) which is constructed in accordance with the present invention. The reference indicator patch 12f is disposed on the object 20 which is moving in a direction 92 when an image is recorded by the image recording apparatus 14.

The reference indicator patch 12f has a first side 94f, an opposed second side 96f spaced a distance from the first side 94f, a first end 98f, and an opposed second end 100f spaced a distance from the first end 98f. The reference indicator patch 12f is provided with a width 102f extending generally between the first side 94f and the second side 96f, and a height 104f extending generally between the first end 98f and the second end 100f. The first side 94f, the second side 96f, the first end 98f, and the second end 100f cooperate to provide the reference indicator patch with an outer peripheral edge 106f defining a predetermined shape. In one embodiment, the predetermined shape is a rectangle.

The width 102f, the height 104f, and the predetermined shape formed by the outer peripheral edge 106f of the reference indicator patch 12f form a reference assembly 26f for permitting the computer apparatus 16 to calculate the speed or motion of the object 20 or the area of interest 18 of the object 20 to which the reference indicator patch 12f is connected.

Shown by the dashed lines in FIG. 8, is an outline of the location of the reference indicator patch 12f at the moment that the shutter of the image recording apparatus 14 is opened during the capturing of an image depicting the object 20 and the reference indicator patch 12f. Shown in the dark lines of FIG. 8 is the reference indicator patch 12f at the moment that the shutter of the image recording apparatus 14 is closed during the capturing of the image of the object 20 and the reference indicator patch 12f. Because the object 20 is moving in the direction 92, the reference indicator patch 12f moves a distance 108f from the moment that the shutter of the image recording apparatus 14 is opened to the moment that the shutter of the image recording apparatus 14 is closed. Thus, the outline of the reference indicator patch 12f as depicted in the image will be distorted or elongated a distance 108f (from the first side 94f at the moment that the shutter is opened to the first side 94f at the moment the shutter is closed, as depicted by the dashed line and the solid line, respectively) in the direction of travel of the object 20. Because the computer apparatus 16 is provided with the predetermined dimensional configuration (i.e., the width 102f, the height 104f, and the predetermined shape of the outer peripheral edge 106f) the computer apparatus 16 can analyze the resulting image of reference indicator patch 12f by modeling techniques to determine any distortions in the height 104f, the width 102f, or the outer peripheral edge 106f to thereby determine an approximation of the direction of travel of the object 20. If the shutter speed of the image recording apparatus is provided to the computer apparatus 16, the computer apparatus 16 can also determine the speed at which the object 20 is moving when the image was captured.

The automated reference system 10 can be used in combination with the systems recited in U.S. Pat. No. 5,214, 711 issued to Neely et al. on May 25, 1993, and in U.S. Pat. No. 5,148,477 issued to Neely et al. on Sep. 15, 1992, which disclosure is hereby incorporated herein by reference to provide additional information to a user of the system 10.

It should be understood that the features of the reference indicator patches 12, 12a, 12b, 12c, 12d, 12e, and 12f have been described herein separately solely for purposes of clarity. It is contemplated that various combinations of the reference assemblies 26, 26b, 26c, 26d, and 26e will be utilized in practice although each of the reference assemblies 26, 26b, 2c, 26d, and 26e can also be utilized separately. For example, the reference assembly 26d can be disposed on the substrate 24e of the reference indicator patch 12e along with the reference assembly 26e to provide information to the computer apparatus 16 indicative of the color or colors of the object 20 and indicative of the ambient light conditions as previously discussed with reference to FIGS. 6 and 7.

Referring now to FIG. 9, and indicated by the reference numeral 10a is another embodiment of an automated reference indicator system constructed in accordance with the present invention. The automated reference indicator system 10a is provided with a first object 20a and a second object 20b. The first and second objects 20a and 20b are identical in construction and function as the object 20 hereinbefore described with reference to FIGS. 1 and 2.

A first reference indicator patch 12g is disposed on the first object 20a, and a second reference indicator patch 12h is disposed on the second object 20b. The first and second reference indicator patches 12g and 12h are substantially identical in construction and function as the reference indicator patches 12, 12a, 12b, 12c, 12d, 12e, and 12f herein before described with reference to FIGS. 1–8.

The system 10a is provided with an image recording apparatus 14a and a computer apparatus 16a. The image recording apparatus 14a and the computer apparatus 16a are substantially identical in construction and function as the image recording apparatus 14 and the computer apparatus 16, respectively, hereinbefore described with reference to FIGS. 1 and 2.

In use, the image recording apparatus 14a captures or records an image 110 depicting the first and second objects 20a and 20b having the first and second reference indicator patches 12g and 12h, respectively, disposed thereon. The image 110 is then transmitted to the computer apparatus 16a from the image recording apparatus 14a via a communication link 28a. The communication link 28a can be a cable, for example.

Once the image 110 is input into the computer apparatus 16a, the computer apparatus 16a can analyze each of the first and second reference indicator patches 12g and 12h separately as hereinbefore described with reference to FIGS. 1–8, or the computer apparatus 16a can analyze the first and second reference indicator patches 12g and 12h together to obtain various information regarding a depth or distance 112 between the first object 20a and the second object 20b. The depth of distance 112 extends in a direction which is substantially to the line of sight of the camera apparatus 14a. In other words, the distance 112 shown in FIG. 9 extends at least partially into the page. For example, the computer apparatus 16a may analyze the first reference indicator patch 129 depicted in the image 110 to determine that the first object is ten feet from the lens of the image recording apparatus 14a. The computer apparatus 16a may then analyze the second reference indicator patch 12h depicted in the image 110 to determine that the second object 20b was five feet from the lens of the image recording apparatus 14a at the moment the image 110 was captured. The computer apparatus 16a can then subtract the distance from the lens of the image recording apparatus 14a to the second object 20b (five feet) from the distance from the lens of the image recording apparatus 14a to the first object 20a (ten feet) to determine that the first and second objects 20a and 20b were separated by a distance or depth about five feet from the lens of the image recording apparatus 14a at the moment the image 110 was captured.

Although the system 10a was described with reference to two objects (20a and 20b) with each having a reference indicator patch (12g and 12h) disposed thereon, it should be understood that the system 10a can function with any predetermined number of objects to selectively calculate or determine the distances or depths therebetween as hereinbefore described with reference to FIG. 9.

Referring now to the FIG. 10, shown therein and designated by the general reference numeral 10b is an automated reference indicator system which is constructed in accordance with the present invention. The automated reference indicator system 10b is similar in construction and function to the automated reference indicator system 10 which was discussed above with reference to FIGS. 1 and 2, except as provided hereinafter. The automated reference indicator system 10b includes a reference indicator patch 12i, an image recording apparatus 14b and a computer apparatus 16b. The image recording apparatus 14b and the computer apparatus 16b are substantially identical in construction and function as the image recording apparatus 14b and the computer apparatus 16. The reference indicator patch 12i is disposed near an area of interest 18b on an object 20b. Only a portion of the object 20b is shown in FIG. 10 for purposes of clarity.

The reference indicator patch 12 is disposed on an exterior surface 21b of the object 20b such that the reference indicator patch 12i and the area of interest 18b are capable of being simultaneously captured by the image recording apparatus 14b to provide a first image 22b (as indicated by the dashed lines) of the area of interest 18b and the reference indicator patch 12i. The object 20b can be any object capable of being imaged or photographed. For example, the object 20b can be a car, a building, a chair, a desk, a human, a painting, a mountain, a lake, or any other type of geography, device, or animal. The area of interest 18b can be identical to the area of interest 18, which was discussed above.

The reference indicator patch 12i is substantially similar in construction and function as the reference indicator patch 12, except that the reference indicator patch 12i is provided with concentric alternating circular or near circular areas 120 with each alternating area 120 having a contrasting color or shade with respect to the adjacently disposed alternating area or areas 120. For example, the alternating areas 120 on the reference indicator patch 12i can alternate from black to white, and vice versa, or from blue or red to white, so long as there is a distinct transition in contrast from one alternating area 120 to the adjacently disposed alternating area 120.

The first image 22b having the simultaneously captured reference indicator patch 12i and the area of interest 18b is received by and stored in the computer apparatus 16b. The computer apparatus 16b is programmed with an algorithm to automatically locate the reference indicator patch 12i in the first image 22b.

The following is one example of an algorithm for automatically locating the reference indicator patch 12b in the first image 22b. It should be noted that in testing this algorithm, it has been found that the following algorithm functions best if the reference indicator patch 12i does not occupies between about 5% to about 15% of the entire area of the first image 22b.

Initially, the first image 22b is mapped from color to black and white using a low intensity threshold to provide a first black and white image. The term "low intensity threshold", as used herein, means on a scale where black=0, and white=1, the threshold should be set less than 0.5. For example, it has been found that a suitable "low intensity threshold" for accomplishing the purposes set forth herein is about 0.3.

Once the first image 22b has been mapped from color to black and white, overly large white blocks are eliminated from the fist black and white image. The term "overly large", as used herein, means larger than would normally be expected given the particular configuration of the alternating contrasting areas 120 on the reference indicator patch 12i, and assuming that the reference indicator patch 12i occupies between about 5% to about 15% of the first image 22b.

The first image 22b is then mapped from color to black and white using a high intensity threshold to provide a second black and white image. The term "high intensity threshold" as used herein, means on a scale where black=0, and white=1, the threshold should be set greater than 0.5. For example, it has been found that a suitable "high intensity threshold" for accomplishing the purposes set forth herein is about 0.7.

Then, a logical AND of the first, black and white image having the overly large white areas removed, and the second black and white image is accomplished to provide a combined image. Overly small blocks and overly thin blocks are then eliminated from the combined image. The terms "overly small blocks", and "overly thin blocks", as used herein, mean areas that are smaller or thinner than would normally be expected given the particular configuration of the alternating contrasting areas on the reference indicator patch 12i, and assuming that the reference indicator patch 12i occupies between about 5% to about 15% of the first image 22b.

The combined image having the overly large blocks, overly small blocks and overly thin blocks removed is then analyzed by the computer apparatus 16b to locate circular, elliptical or near circular shapes. For example, a boolean cross-correlation can be taken on the combined image having the overly large blocks, overly small blocks and overly thin blocks removed to locate any circular, elliptical or near circular shapes. This provides an estimation of the location of the reference indicator patch 12i in the combined image having the overly large blocks, the overly small blocks and the overly thin blocks removed, and thereby provides an estimation of the location of the reference indicator patch 12i in the first image 22b.

To more accurately determine the location and size of the reference indicator patch 12b in the first image 22b, the first image 22b is mapped from color to black and white using a low intensity threshold to provide the first black and white image, and then the center and size of the concentric areas 120 having contrasting colors or shades is accurately determined in the first black and white image by flood filling each area 120 based on the estimation of the location of the reference indicator patch 12i while tracking minimums and maximums of the Cartesian coordinates.

Once the Cartesian coordinates of the reference indicator patch 12i are determined, other data related to the area of interest 18b can be determined in a similar manner as discussed above with reference to the area of interest 18. For example, dimensional analysis of the area of interest 18b, such as the area (not shown) of the area of interest 18, or a length 30b of the area of interest 18b, or a width 32b of the area of interest 18b can be determined. Other images can be taken of the combination of the reference indicator patch 12i, the object 20b and the area of interest 18b, and analyzed and compared with the analysis of the first image 22b to determine the differences between the area of interest 18b as depicted in the first image 22b and any one or more of the other images, in a similar manner as discussed above with respect to the area of interest 18 in the first image 22 and the area of interest 18a in the second image 34.

Changes may be made in the construction and operation of the various components and assemblies described herein and changes may be made in the steps or the sequence of steps of the methods described herein without departing from the spirit and the scope of the invention as defined in the following claims.

What is claimed is:

1. A reference indicator patch disposable on an object and capable of being captured in an image by an image recording apparatus adapted to communicate with a computer apparatus, comprising:

a substrate adapted to be disposed on the object such that the substrate only covers a portion of the object; and reference means disposed on the substrate such that the reference means is perceivable by the image recording apparatus during the capturing of the image for providing the computer apparatus with an image having a reference therein to permit the computer apparatus to generate data relative to the object.

2. A reference indicator patch as defined in claim 1, wherein the reference means includes indicia disposed on the substrate in any appropriate configuration recognizable by the computer apparatus to form the reference permitting the computer apparatus to generate data relative to the object.

3. A reference indicator patch as defined in claim 2, wherein the indicia of the reference means form a plurality of lines which are spaced a distance apart, and wherein the spacing of the lines forms the reference permitting the computer apparatus to generate data relative to the object.

4. A reference indicator patch as defined in claim 2, wherein the indicia of the reference means is formed by a plurality of lines having a predetermined dimensional configuration to form a reference permitting the computer apparatus to generate data relative to an area of interest of the object.

5. A reference indicator patch as defined in claim 2, wherein the indicia of the reference means is formed with a plurality of predetermined shapes to form a reference permitting the computer apparatus to generate data relative to an area of interest of the object.

6. A reference indicator patch as defined in claim 2, wherein the indicia of the reference means is formed by a plurality of colors which are of a certain configuration, and wherein the colors and configuration of indicia on the reference indicator patch form a reference permitting the computer apparatus to generate data relative to the color of an area of interest of an object.

7. A reference indicator patch as defined in claim 1, wherein the reference means forms a reference to permit the computer apparatus to calculate the distance between the image recording apparatus and the object.

8. A reference indicator patch as defined in claim 1, wherein the substrate is disposable near an area of interest on the object, and wherein the reference means permits the computer apparatus to calculate data regarding the boundaries of the area of interest.

9. A reference indicator patch as defined in claim 1, further comprising code means disposed on the substrate such that the code means is perceivable by the image recording apparatus for indicating a particular one of a plurality of reference means disposable on the substrate to the computer apparatus.

10. A reference indicator patch as defined in claim 9, wherein the connecting means includes a bonding material disposed on the substrate to permit the substrate to be bondingly connected to at least a portion of the object.

11. A reference indicator patch as defined in claim 1, further comprising connecting means for permitting the substrate to be connected to the object.

12. A method for generating data relative to an object, comprising the steps of:

a. inputting a first image depicting at least a portion of an object and a first reference indicator patch disposed on the object into a computer apparatus, the first reference indicator patch only covering a portion of the object;

b. locating, via the computer apparatus, the first reference indicator patch depicted in the first image; and c. generating, via the computer apparatus, data relative to the object based on an analysis of the first reference indicator patch.

13. A method as defined in claim 12, wherein step (a) is defined further to include the steps of:

disposing the first reference indicator patch on at least a portion of the object;

capturing an image depicting at least a portion of the object encompassing the first reference indicator patch.

14. A method as defined in claim 12, wherein step (c) is defined further to include the step of determining the distance from the object to an image recording apparatus utilized in obtaining the first image depicting the portion of the object based on the analysis of the first reference indicator patch.

15. A method as defined in claim 12, wherein in step (a) is defined further to include the step of disposing the first reference indicator patch near an area of interest on the object, and wherein step (c) is defined further to include the step of calculating a first set of data regarding the boundaries of the area of interest based on the analysis of the first reference indicator patch.

16. A method as defined in claim 15, further comprising the steps of:

d. inputting a second image depicting the area of interest of the object and a second reference indicator patch captured at a time different from when the first image was captured into the computer apparatus;

e. locating, via the computer apparatus, the second reference indicator patch depicted in the second image;

f. calculating via the computer apparatus, a second set of data regarding the boundaries of the area of interest based on an analysis of the second reference indicator patch; and g. comparing via the computer apparatus, the first set of data to the second set of data to determine differences between the area of interest as depicted in the first image and the area of interest as depicted in the second image.

17. A method as defined in claim 16, wherein the object is a human and the area of interest is a wound, and wherein the step of comparing the first set of data to the second set of data comprises the step of evaluating the change in size of the wound over time.

18. A method as defined in claim 12, wherein in step (a) the object depicted in the first image was moving when the first image was captured, and wherein step (c) includes the step of determining the speed at which the object depicted in the first image was moving based on an analysis of the first reference indicator patch depicted in the first image and the shutter speed of the image recording apparatus utilized to capture the first image.

19. A method as defined in claim 12, wherein in step (a) the first reference indicator patch depicted in the first image provides information relative to the ambient light conditions surrounding the object depicted in the first image.

20. A method as defined in claim 12, wherein in step (a) at least two objects are depicted in the first image, the first reference indicator patch being disposed near one of the objects and a second reference indicator patch being disposed near the other one of the objects, and wherein step (c) includes the step of determining the distance between the two objects based on an analysis of the first and second reference indicator patches.

* * * * *

UNITED STATES PATENT AND TRADEMARK OFFICE
CERTIFICATE OF CORRECTION

| | |
|---|---|
| PATENT NO. | : 6,873,340 B2 |
| APPLICATION NO. | : 10/322278 |
| DATED | : March 29, 2005 |
| INVENTOR(S) | : James H. Luby |

It is certified that error appears in the above-identified patent and that said Letters Patent is hereby corrected as shown below:

Column 13, Line 6: Delete the number "129" and replace with -- 12 g --.

Signed and Sealed this

Twenty-seventh Day of March, 2007

JON W. DUDAS
*Director of the United States Patent and Trademark Office*